United States Patent [19]

Holstein

[11] 4,161,841
[45] Jul. 24, 1979

[54] FISHING DEVICE

[76] Inventor: Frederick W. Holstein, 1331 Howe St., Racine, Wis. 53403

[21] Appl. No.: 872,552

[22] Filed: Jan. 26, 1978

[51] Int. Cl.² ............................................. A01K 95/00
[52] U.S. Cl. .................................. 43/43.13; 43/42.23
[58] Field of Search ................ 43/43.13, 43.14, 42.03, 43/42.06, 42.22, 42.23

[56] References Cited

U.S. PATENT DOCUMENTS

| | | | |
|---|---|---|---|
| 2,789,386 | 4/1957 | Creelman | 43/43.13 |
| 2,889,657 | 6/1959 | Bowman | 43/42.06 |
| 3,466,787 | 9/1969 | Collins | 43/43.14 X |
| 3,796,000 | 3/1974 | Nye | 43/43.13 |
| 3,973,349 | 8/1976 | England | 43/42.03 |
| 4,028,839 | 6/1977 | Stubblefield | 43/43.13 |
| 4,038,774 | 8/1977 | Misiak | 43/42.23 |

FOREIGN PATENT DOCUMENTS 1344477  10/1962  France .................................... 43/43.13

Primary Examiner—Nicholas P. Godici
Attorney, Agent, or Firm—Wegner, Stellman, McCord, Wiles & Wood

[57] ABSTRACT

A fishing device having a body and a pair of wings extending outwardly from each side of the body and angled upwardly relative thereto to provide thrust surfaces, and a pair of deflectors associated with each wing including a front deflector and a rear deflector for initiating alternate rising and diving of the fishing device as the angle of a connecting bail changes relative to the body at different levels in the water because of the connection thereof to a moving tow line. Additionally, bimetal controlled weight structure is associated with the body and selectively operable to control the rise and dive limits of the fishing device to a range of water temperatures regardless of the angle of the bail.

18 Claims, 9 Drawing Figures

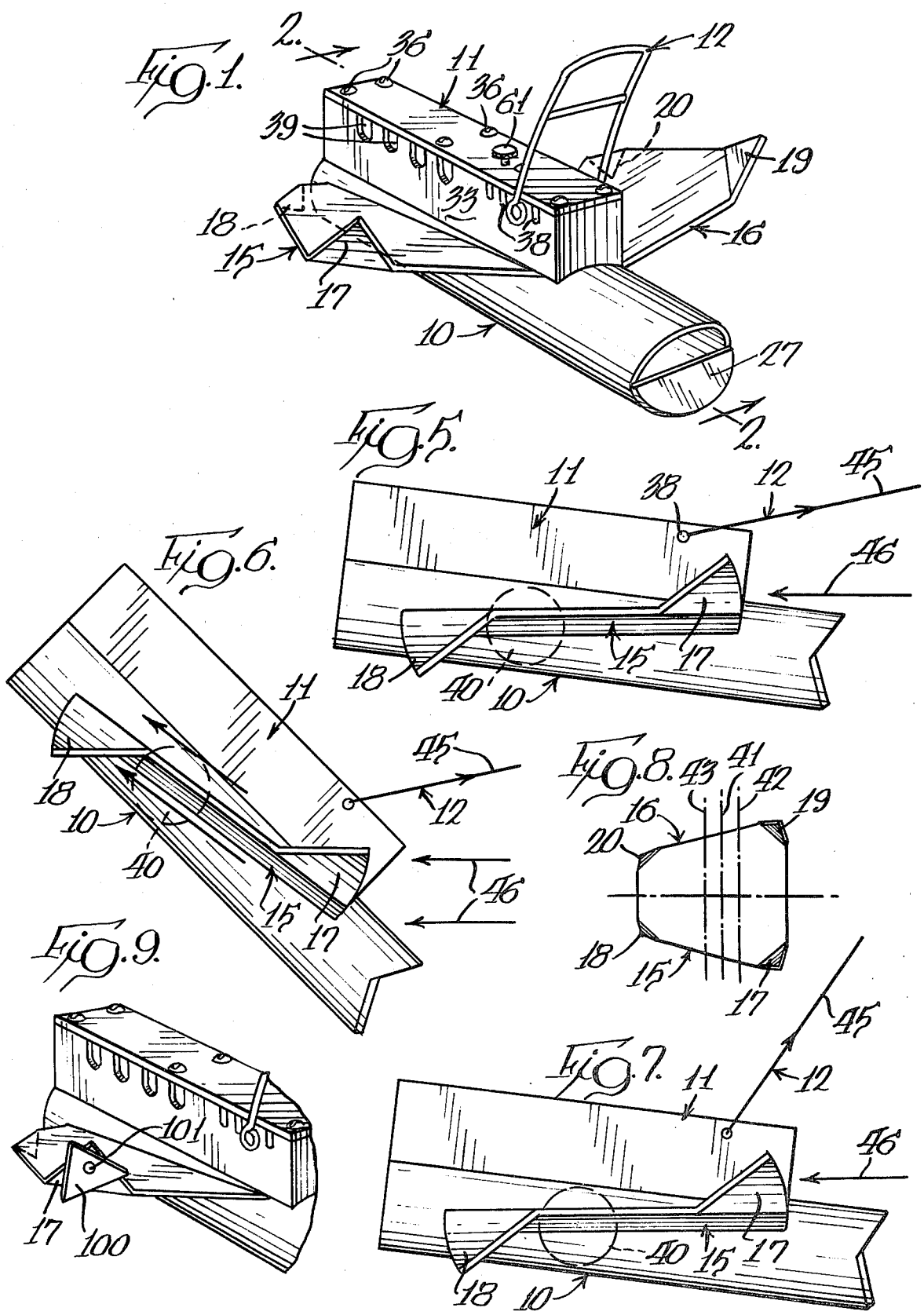

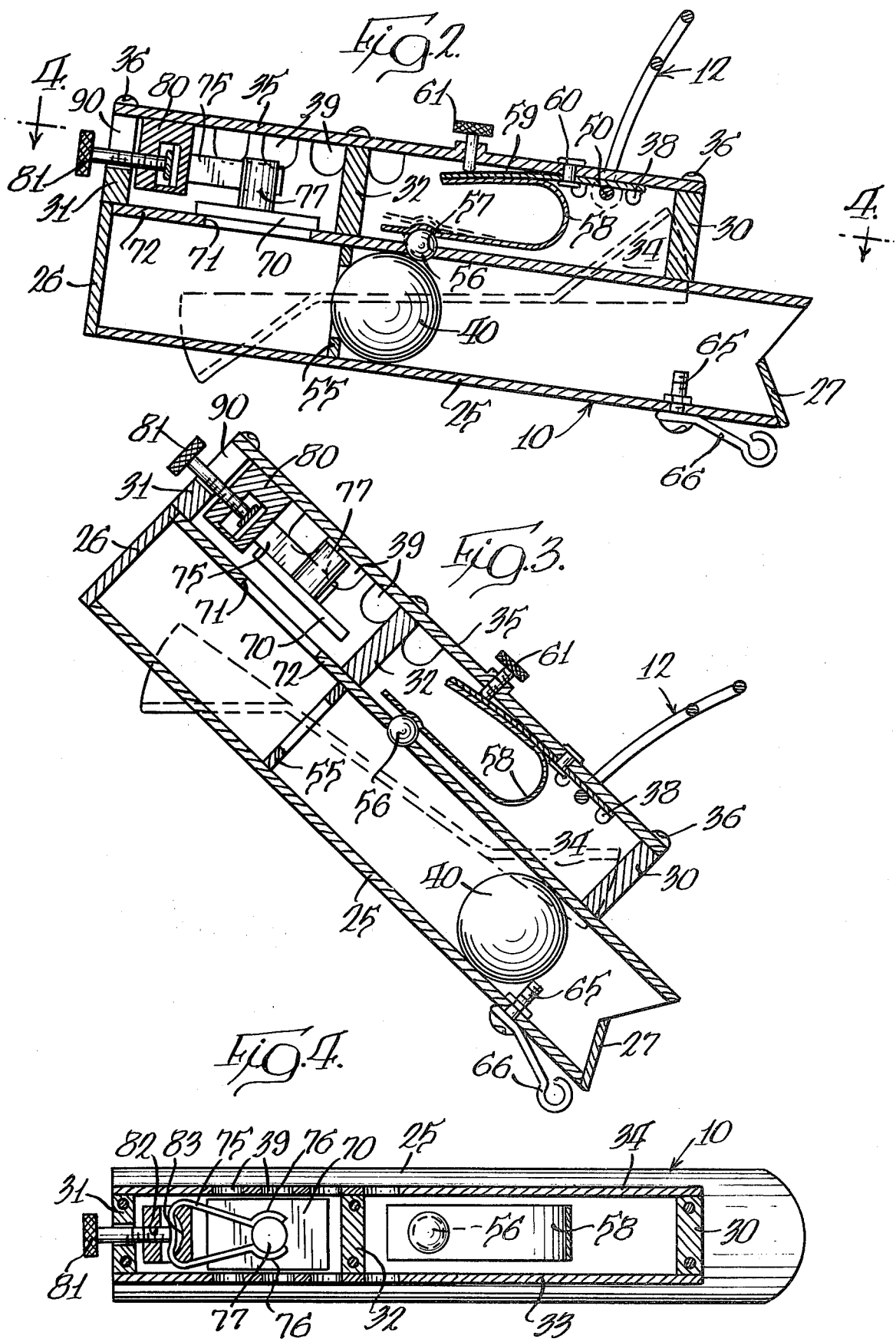

FISHING DEVICE

BACKGROUND OF THE INVENTION

This invention pertains to fishing devices for causing action of a controlled fishing lure in rising and diving action and for selectively controlling the action within a range of water temperatures.

Most fishermen understand that if a trailing lure can be made to rise and dive and also oscillate, the results are very successful. Additionally, in many instances, fish are found in water having a temperature which is to their liking and if the action of the lure is controlled within the proper range of water temperatures the changes of successful fishing increase.

A prior application of the applicant, Ser. No. 755,184, filed Dec. 29, 1976, now U.S. Pat. No. 4,079,539 discloses a fishing device with bimetal controlled weight structure for causing operation of the device within a desired range of water temperatures.

SUMMARY OF THE INVENTION

A primary feature of the invention is to provide a fishing device which may be associated with a fishing lure and during trolling cause a rise and dive action of the lure as well as oscillation because of the relation between the structure of the fishing device and the angle of the tow line which connects to the device.

Still another feature of the invention is to provide a fishing device as defined in the preceding paragraph wherein the fishing device controls the action of the lure to operate within predetermined ranges of water temperature as selected by adjustment of bimetal controlled weight structure.

In carrying out the foregoing, an object of the invention is to provide a fishing device having a body with a pair of planar wings extending outwardly one from each side of the body and having an upward dihedral angle to provide thrust surfaces for controlling the attitude of the body while moving in water and the wings forming a trapezoid in plan and tapering rearwardly and inwardly relative to the body, a bail pivotally connected to said body for connection to a tow line and said pivot connection being located rearwardly of the center of the wing area to provide more wing area forwardly thereof, and a pair of front and rear spoilers associated with each wing for causing alternate rising and diving of the device as the angle of the bail to the body changes at different levels in the water because of the tow line connection.

Still another object of the invention is to provide a fishing device as defined in the preceding paragraph wherein the body has means associated therewith to control the rise and dive limits of the device to a range of water temperatures with said means including a weight movable to two different positions within the body and bimetal means for controlling the position of the weight including a bimetal controlled valve for trapping a column of water in the housing to hold the weight in a position for dive action.

Still another object of the invention is to provide a fishing device as described in the preceding paragraphs having a structure which is easily manufactured and assembled to provide a unit available to fishermen at a practical cost for improved fishing.

BRIEF DESCRIPTION OF THE DRAWINGS

FIG. 1 is a perspective view of the fishing device;
FIG. 2 is a longitudinal section, taken generally along the line 2—2 in FIG. 1 and on an enlarged scale;
FIG. 3 is a sectional view, similar to FIG. 2, showing the parts in a different orientation and position;
FIG. 4 is a sectional view, taken generally along the line 4—4 in FIG. 2;
FIG. 5 is a diagrammatic view showing the fishing device in a position preparatory to diving;
FIG. 6 is a diagrammatic view of the fishing device in the diving attitude;
FIG. 7 is a diagrammatic view of the fishing device preparatory to raising;
FIG. 8 is a diagrammatic plan view of the wing area of the fishing device on a reduced scale; and
FIG. 9 is a fragmentary perspective view, similar to FIG. 1, showing a modification of the fishing device which allows the unit to run at a distance to the side and parallel to the movement of the boat.

DESCRIPTION OF THE PREFERRED EMBODIMENTS

The fishing device is shown generally in FIG. 1 and has a tubular body 10 with a rectangular structure, indicated generally at 11, secured to the upper side thereof to define a chamber and pivotally mounting a bail, indicated generally at 12, which connects to a tow line, as shown for example in my prior copending application, Ser. No. 755,184, filed Dec. 29, 1976, and with the structure therein being incorporated herein by reference. A pair of wings, indicated generally at 15 and 16, extend outwardly from opposite sides of the tubular body 10, with the planar extent thereof being inclined upwardly to a small degree to have the wings form an upward dihedral angle.

The wings 15 and 16 each have front and rear deflectors which act as spoilers; the wing 15 having a front spoiler 17 turned upwardly and a rear spoiler 18 turned downwardly. The wing 16 has a front spoiler 19 turned upwardly and a rear spoiler 20 turned downwardly.

The tubular body 10 is shown particularly in FIGS. 2-4 and is formed of a cylindrical member 25 which is open at a front end and has a closed end 26. The open forward end of the body is cut back from the leading edge thereof and an upwardly-inclined plate 27 spans the lower half of the opening to provide for oscillation of the fishing device as it is moved through the water.

The rectangular structure 11 secured to the tubular body has transverse front and rear walls 30 and 31, with an intermediate internal transverse wall 32 along with side walls 33 and 34, with all of the walls being of the same height and with a removable cover 35 defining an internal chamber. The cover is removably attached to the walls by a series of threaded attaching members 36.

The side walls 33 and 34 are provided with a forward series of openings 38 and a rear series of openings 39, with the front series of openings 38 providing an adjustable mounting for the bail 12 relative to the tubular body 10 and providing a pivot connection relative thereto at a level thereabove.

The bail 12 is formed of bendable material whereby the action of the fishing device in association with the pull from the tow line may be varied in addition to variation derived from the location of the pivot connection of the bail relative to the tubular body.

The rising and diving action of the fishing device as well as the oscillation thereof may now be described and in this description it is assumed that a weight in the form of a ball 40, which is movably mounted within the tubular body 10 for a purpose hereinafter described, is retained in the position shown in FIG. 2.

At the outset, reference should be made to FIG. 8 wherein the wing areas of the wings 15 and 16 are shown in reduced scale. The wings form a trapezoid in plan and taper rearwardly and inwardly. A line 41 shows the axis of the pivot connection of the bail 12 relative to the body, while a line 42 shows the center of equal plane areas of the wings in a forward to reverse relation and a line 43 shows the center of gravity of the fishing device as well as the physical center of the wings measured from front to rear.

As an example, the tubular body may be approximately 7" long, with a wing having a front to rear dimension of approximately 4" and a span approximately 4" at the front and 2" at the back.

In FIG. 5, the fishing device is shown in an attitude near the water surface, with a tow line 45 connected to the bail 12 and at a relatively small angle to the fishing device. The movement through the water creates a water flow past the fishing device, generally in the direction indicated by the arrow 46. In this attitude, the force created by the tow line 45 and the force created by the water acting on the front spoilers 17 and 19 and the water force acting against the rear spoilers 18 and 20 causes the rear of the fishing device to rise. As the rear rises, the force acting on the rear spoilers as well as that of the tow line causes the unit to pivot about the location of the front spoilers to enable water force to act on the upper surface of the wings and, since there is a greater area forward of the pivot connection, the device assumes the diving attitude of FIG. 6. The unit will dive until the angle of the tow line 45 and bail 12 changes to that shown in FIG. 7 or shortly prior thereto. When the attitude is as shown in FIG. 7, there is a slight lift because of the front spoilers 17 and 19 to lift the front spoilers, with the result that the underside of the wings are exposed to the force of water, as indicated by arrow 46, to cause the device to climb until the tow line angle changes to that shown approximately in FIG. 5, with the action then reversing for a subsequent dive. During the rise and fall of the fishing device, the front end thereof, including the plate 27, causes the fishing device also to oscillate from right to left. The plate 27 starts the deviation in travel and a rear spoiler returns the device to a straight path.

The action in rising and diving may be changed by changing the connection of the bail 12 to the fishing device by locating a transverse part 50 thereof in a different one of the slots 38 in the side walls 33 and 34. Additionally, a different action may be obtained by imparting a different curvature to the bail 12 because of the bail being formed of bendable material.

In order to control the range of water temperatures in which the fishing device rises and dives, the unit includes weight means in the form of the ball 40, previously mentioned, which is movable between the position shown in FIG. 2 and the position shown in FIG. 3. The ball 40 is of a size to permit limited water flow therepast.

The ball 40 has a rearward position, shown in FIG. 2, in which it is held against an apertured plate 55 by means of bimetal control means including a small diameter ball 56 positioned within an opening 57 in the cylindrical member 25 which is of a diameter less than the major diameter of the ball whereby the ball cannot fall therethrough, as shown in FIG. 3, and with the force of the ball 56 being controlled by a bimetal member 58. The bimetal member 58 is attached to a mounting strip 59 which is secured to the underside of the cover 35 by a rivet 60 and the action of the bimetal member may be varied by a threaded adjusting member 61 carried by the cover which is threaded into the cover and engages the mounting strip 59.

The forward position of the ball 40 is controlled by a threaded member 65 mounted in the cylindrical member 25 and which also carries a hook member 66 for connection to an auxiliary line to retain the fishing device after release thereof from the fishing lure as by connection to a line 174, as shown in the prior copending application.

The retention of the ball 40 in the forward position shown in FIG. 3 is controlled by bimetallic valve means including a rectangular valve member 70 which coacts with a rectangular opening 71 in a planar section 72 of the tubular body and is movable between the positions shown in FIGS. 2 and 3. The valve member 70 is retained in the position shown in FIG. 2 by means of a generally U-shaped bimetal strip 75 having a pair of arcuate ends 76 which surround an upwardly-extending stem 77 on the valve member. The bimetal strip 75 is captured within a depending block 80 supported on the underside of the cover 35 and has its force varied by an adjusting screw 81 threaded into a section 82 of the block and coacting with the intermediate part of the metal strip 75 to vary the curvature thereof against an arcuate section 83 of the supporting block.

The function of the weight 40 is to upset the relation previously described in connection with the dive and rise action of the fishing device.

In the previous operation, the weight 40 was described as being held in the position of FIG. 2. With the fishing device rising to a preselected level of water of a certain temperature, the bimetal strip 58 is caused to contract to reduce the force on the ball 56 whereby the ball 40 may roll forwardly in the tubular body 10 because of the body being at a slightly downward incline until the ball engages the stop member 65. The ball has sufficient weight whereby the adjustment position thereof shifts the center of gravity of the fishing device from the relation shown in FIG. 8 and overcomes the equilibrium conditions caused by the wings and spoilers with the result that the fishing device goes into a dive. During this time, the valve member 70 is closed to block water flow through the tubular body 10. Although there is water pressure acting on the ball 40, there is no water flow through tubular body 10 and, therefore, gravity maintains the ball 40 in the position shown in FIG. 3. When a desired lower water temperature is reached, the bimetal strip 75 expands to release the stem 77 of the valve member whereby water is free to flow into the tubular body 10 through the open front end thereof and through the aperture plate 55 to cause the ball 40 to move rearwardly and stop against the apertured plate. The ball 40 is retained in its rearward position by snapping into position behind the retention ball 56.

The initial flow of water passes through the valve opening 71 and through the apertures 39 in the side walls of the rectangular structure. After the ball 40 seats against the apertured plate 55, there is no longer any flow through said plate, whereby the valve member 70 is free to fall by gravity into position against the valve opening 71. With this shift of the weight rearwardly, the device will rise because of the angle of the tow line 45 and the bail 12 relative to the body as previously described.

It will be noted in FIGS. 2 and 3 that the controlling action of the bimetals 58 and 75 may be adjusted by operation of their respective adjusting screws 61 and 81 and all of this structure is mountable to cover 35 for ease of assembly thereto and then placement on the remainder of the rectangular structure. The end wall 31 has a vertical slot 90 whereby the adjusting screw 81 can be positioned intermediate the height of the end wall 31.

In a modification, each of the front spoilers, such as spoiler 17 shown in FIG. 9, has an extension 100 of the same shape rotatably attached thereto by a rivet 101 whereby the extension 100 may coincide with the spoiler to be in inoperative position or may be pivoted outwardly to an operative position. An extension 100 in operative position increases the effective action of one of the spoilers and provides a side planing action to have the fishing device track outwardly of a straight line coincident with the direction of the tow line 45 and boat travel.

I claim:

1. A fishing device having a body, a bail pivotally connected to said body intermediate the ends thereof for connection to a tow line, a pair of wings extending outwardly one from each side of the body and angled relative thereto to provide thrust surfaces for controlling the attitude of the body while moving in water, and front and rear deflectors associated with each wing in fixed relation thereto with the front deflector turned up from the plane of the wing and the rear deflector turned down from the plane of the wing for causing alternate rising and diving of the device as the angle of the bail to the body changes at different levels in the water because of the tow line connection.

2. A fishing device as defined in claim 1 wherein said body has a downward tilt when said wing planes are horizontal and a deflector plate at the front end of the body to cause sideways movement of the front end of the body during movement through the water and said rear deflectors reacting in the water to straighten out the body.

3. A fishing device as defined in claim 1 wherein said body has means at plural locations along the length thereof for pivotal connection of the bail thereto.

4. A fishing device as defined in claim 1 wherein said bail is formed of bendable material to vary the tow line angle to said body.

5. A fishing device as defined in claim 1 including means associated with said body to control the rise and dive limits of said device to a range of water temperatures.

6. A fishing device as defined in claim 5 wherein said means for controlling the rise and dive limits includes a movable weight and bimetal means responsive to water temperature for controlling the position of said weight.

7. A fishing device connectable to a tow line comprising a body with a tubular housing with a forward open end, a bail pivotally connected to said body for attachment to the tow line, wing means connected to said body for controlling the attitude of the body while travelling through water, weight means movable in said tubular housing to two different positions to cause either rise or dive action of the device, first means including a bimetal member to releasably retain said weight means in a position for rise action, and bimetal controlled valve means for trapping a column of water in said housing to hold the weight means in a position for dive action.

8. A fishing device as defined in claim 7 wherein said housing has a front stop to limit forward movement of the weight means and establish the dive action position, and an apertured plate in said housing to limit rearward movement of the weight and establish the rise action position.

9. A fishing device as defined in claim 8 wherein said weight means is a ball, and said first means includes a smaller ball yieldably urged by the bimetal member to a position to hold the ball against the apertured plate, the force of the bimetal member decreasing with increasing temperature.

10. A fishing device as defined in claim 8 wherein said valve means includes a passage to permit flow through said housing and apertured plate, a valve member movable to open and close said passage, and a second bimetal member for holding said valve member closed and operable with decreasing temperature to release said valve member for movement to open said passage and release said trapped column of water.

11. A fishing device as defined in claim 10 wherein said body has a chamber alongside said tubular housing, and a removable cover member for said chamber which adjustably mounts said bimetal members.

12. A fishing device as defined in claim 10 wherein said wings each have a front deflector turned up from the plane of the wing and a rear deflector turned down from the plane of the wing.

13. A fishing device as defined in claim 12 wherein said body has a downward tilt when said wing planes are horizontal and a deflector plate at the front end of the body to cause sideways movement of the front end of the body during movement through the water and said rear deflectors reacting in the water to straighten out the body.

14. A fishing device as defined in claim 12 wherein said body has means at plural locations along the length thereof for pivotal connection of the bail thereto.

15. A fishing device as defined in claim 12 wherein said bail is formed of bendable material to vary the tow line angle to said body.

16. A fishing device as defined in claim 12 wherein said front and rear deflectors define spoilers for the wings and are at angles thereto to control the angle of the wings during rising and diving of the device in the water.

17. A fishing device having a body, a bail pivotally connected to said body intermediate the ends thereof for connection to a tow line, a pair of planar wings extending outwardly one from each side of the body and having an upward dihedral angle to provide thrust surfaces for controlling the attitude of the body while moving in water, said wings forming a trapezoid in plan and tapering rearwardly and inwardly relative to the body, said pivotal connection of the bail to the body being located rearwardly of the center of the wing area to provide more wing area forwardly thereof, and front and rear spoilers associated with each wing for causing alternate rising and diving of the device as the angle of the bail to the body changes at different levels in the water because of the tow line connection.

18. A fishing device as defined in claim 17 wherein said front spoilers each have an extension movably mounted thereon for movement between a retracted inoperative position and an operative position beyond the front spoiler to provide a side planing action.

* * * * *